(No Model.)
L. S. ELLIS.
CRUPPER.
No. 458,674. Patented Sept. 1, 1891.
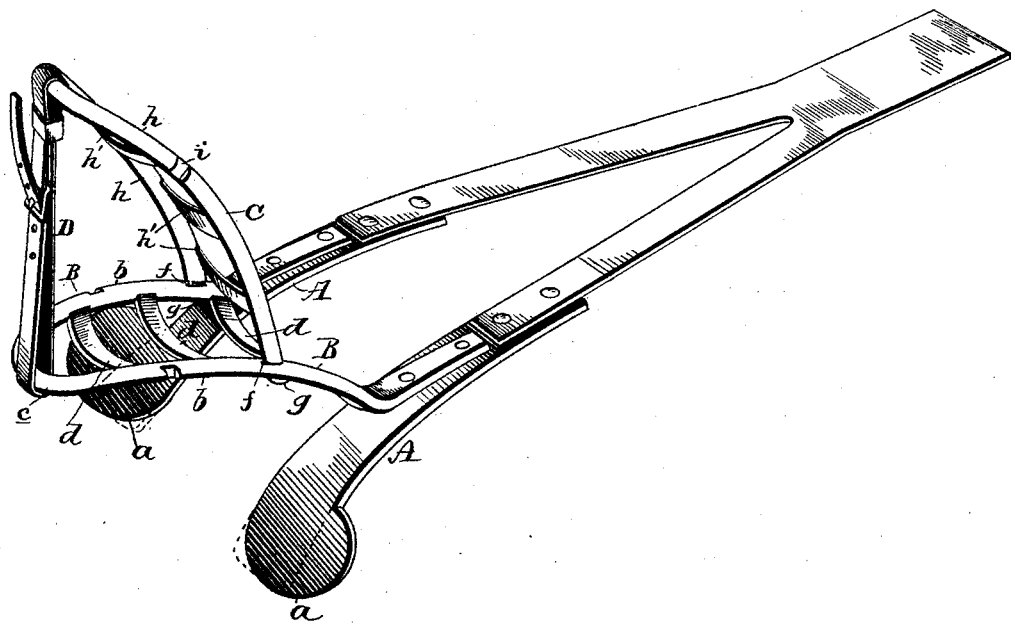
Witnesses
G. F. Downing
S. C. Nottingham
Inventor
Lewis S. Ellis
By H. A. Seymour
Attorney

UNITED STATES PATENT OFFICE.

LEWIS SANDERS ELLIS, OF EMINENCE, KENTUCKY.

CRUPPER.

SPECIFICATION forming part of Letters Patent No. 458,674, dated September 1, 1891.

Application filed March 24, 1891. Serial No. 386,253. (No model.)

*To all whom it may concern:*

Be it known that I, LEWIS SANDERS ELLIS, of Eminence, in the county of Henry and State of Kentucky, have invented certain new and useful Improvements in Cruppers; and I do hereby declare the following to be a full, clear, and exact description of the invention, such as will enable others skilled in the art to which it appertains to make and use the same.

My invention relates to an improvement in cruppers, and has for its object to produce a crupper which shall be of simple, substantial construction, cheap to manufacture, and which shall be effective in the performance of its functions.

A further object is to construct a crupper in such manner that it can be readily applied to a horse to maintain his tail in an elevated position without chafing him or slipping from its proper position, and by means of which the tail shall be maintained properly elevated without depriving the horse of the free use of his tail for keeping flies off.

A further object is to construct a crupper in such manner that the horse's tail may be maintained elevated at different degrees of elevation, as desired, and so that a portion thereof may be readily removed when not in use.

With these objects in view the invention consists in the combination, with a crupper, of a removable support.

It also consists in the combination, with two arms adapted to rest against the buttock of a horse, of a support secured to and adapted to connect said arms and having cross-bars to receive and support a horse's tail.

It also consists in the combination, with two arms adapted to bear on the buttock of a horse, of a support secured to said arms and adapted to connect the same, cross-bars connecting the opposite sides of said support to receive the horse's tail, and a removable support removably connected to said rigid support.

The invention also consists in certain novel features of construction and combinations and arrangements of parts, as hereinafter set forth, and pointed out in the claims.

The accompanying drawing illustrates a view in perspective of my improved crupper.

A A represent two arms or supports, preferably curved somewhat and enlarged at their lower ends to produce supports $a$, adapted to bear on the buttock of a horse, said supports $a$ being preferably made with curved edges, as shown in full lines in the drawing, or said supports may be made straight, as shown in dotted lines. The upper ends of the arms A are perforated for the reception of suitable fastening devices, whereby to secure straps from the harness thereto. Secured to the arms A, at points in proximity to their upper ends, is a support B, said support comprising two side bars $b\ b$, adapted to be secured to the arms A and project upwardly and outwardly therefrom, a curved end connecting-bar $c$, integral with the side bars and connecting the same, and curved cross-bars $d$, connecting the side bars at various points. With the device thus constructed it will have a broad firm bearing on the buttock of the horse without other contact with the horse except his tail, thereby avoiding chafing or otherwise injuring him. The horse's tail will rest in the curved support B and be maintained at the proper elevation, thereby improving the appearance of the horse and enhancing him in value. The horse will be permitted free use of his tail to keep flies off. If desired, the horse's tail may be strapped to the support B, in which case suitable notches will be made in the side bars $b$ to retain the straps in place, or instead of the notches lugs may be made on the side bars.

At points in proximity to their connection with the arms A A the side bars of the support B are provided with slots or perforations $f$, for the reception of the hooked ends $g$ of a supplemental removable support C, said support C being composed of curved side bars $h$ and curved cross-bars $h'$, and in general form and construction very similar to the support B. The support C is preferably provided with notches $i$, (or lugs, if desired,) adapted to maintain straps in place for securing a horse's tail to said support. This supplemental support is intended more particularly for use in the stable for "growing" a horse's tail; but this supplemental support may be used when the horse is in service, when it is desired to support the tail at a higher degree of elevation than the support B will permit.

It is evident that my improved crupper may be made very cheaply, and that when applied to a horse it will operate most effectually in the performance of its functions without being unsightly or injuring the horse in any manner. It may be desirable sometimes to provide additional means for connecting the two supports together, in which case the ends of the two supports may be connected by a strap D.

Slight changes might be made in the details of construction of my invention without departing from the spirit thereof or limiting its scope. Hence I do not wish to limit myself to the precise details of construction herein set forth; but, Having fully described my invention, what I claim as new, and desire to secure by Letters Patent, is—

1. In a crupper, the combination, with two arms adapted to bear against the buttock of a horse, of a rigid support secured to and connecting said arms and having cross-bars to receive and support a horse's tail, substantially as set forth.

2. In a crupper, the combination, with two arms having enlarged ends to produce supports to bear against the buttock of a horse, of a support secured to and connecting said arms and having cross-bars to receive and support the horse's tail, substantially as set forth.

3. In a crupper, the combination, with two arms adapted to bear on the buttock of a horse, of a support secured to said arms and adapted to connect them, cross-bars connecting the opposite side of said support to receive a horse's tail, and an auxiliary support removably connected to the rigid support, substantially as set forth.

4. In a crupper, the combination, with two arms, of a support rigidly secured thereto, an auxiliary support connected to said rigid support, and a strap connecting the free ends of said supports, substantially as set forth.

5. In a crupper, the combination, with two arms, of a support rigidly secured thereto and provided with perforations, and a removable support having hook-shaped ends to enter said perforations, substantially as set forth.

In testimony whereof I have signed this specification in the presence of two subscribing witnesses.

LEWIS SANDERS ELLIS.

Witnesses:
   W. S. HUDSON,
   W. O. MOODY.